US012381432B2

(12) United States Patent
Gerbetz et al.

(10) Patent No.: US 12,381,432 B2
(45) Date of Patent: Aug. 5, 2025

(54) FAULT TOLERANT REDUNDANT ELECTRIC MOTOR

(71) Applicant: Moog Inc., East Aurora, NY (US)

(72) Inventors: Robert P. Gerbetz, Waukegan, IL (US); Richard Fosdick, Clarence Center, NY (US)

(73) Assignee: Moog Inc., East Aurora, NY (US)

( * ) Notice: Subject to any disclaimer, the term of this patent is extended or adjusted under 35 U.S.C. 154(b) by 191 days.

(21) Appl. No.: 18/012,601

(22) PCT Filed: Jul. 19, 2021

(86) PCT No.: PCT/US2021/042187
§ 371 (c)(1),
(2) Date: Dec. 22, 2022

(87) PCT Pub. No.: WO2022/020240
PCT Pub. Date: Jan. 27, 2022

(65) Prior Publication Data
US 2023/0253846 A1  Aug. 10, 2023

Related U.S. Application Data

(60) Provisional application No. 63/053,790, filed on Jul. 20, 2020.

(51) Int. Cl.
*H02K 3/28* (2006.01)
*H02K 11/33* (2016.01)
*H02K 21/16* (2006.01)

(52) U.S. Cl.
CPC .............. *H02K 3/28* (2013.01); *H02K 21/16* (2013.01); *H02K 11/33* (2016.01); *H02K 2213/06* (2013.01)

(58) Field of Classification Search
CPC ........ H02K 11/33; H02K 16/04; H02K 21/16; H02K 2213/06; H02K 3/28
(Continued)

(56) References Cited

U.S. PATENT DOCUMENTS 9,564,779 B2 * 2/2017 Nakano .................. H02K 1/165
9,866,083 B2 * 1/2018 Tamura .................... H02K 3/28
(Continued)

FOREIGN PATENT DOCUMENTS

EP  3 016 247 A1  5/2016
EP  3 370 327 A1  9/2018
(Continued)

OTHER PUBLICATIONS

Translation of foreign document EP 3016247 A1 (Year: 2016).*
(Continued)

*Primary Examiner* — Alex W Mok
(74) *Attorney, Agent, or Firm* — Harter Secrest & Emery LLP

(57) ABSTRACT

An electric motor assembly comprising a rotor, a stator, first and second electromagnetic winding in first and second separate slot sets of a plurality of stator slots operatively configured to be selectively energized to exert a torque on the rotor, the first windings comprising first and second coils in first and second pairs of slots in the first slot set, the first coil comprising a first number of turns and the second coil comprising a second number of turns that is greater than the first number of turns, the second windings comprising third and fourth coils in third and fourth pairs of slots in the second slot set, the third coil comprising a third number of turns and the fourth coil comprising a fourth number of turns that is greater than the third number of turns.

24 Claims, 4 Drawing Sheets

(58) Field of Classification Search
USPC .......................................................... 310/179
See application file for complete search history.

(56) References Cited

U.S. PATENT DOCUMENTS

| | | | | |
|---|---|---|---|---|
| 9,871,417 | B2* | 1/2018 | Saito | H02K 1/2706 |
| 2009/0251023 | A1* | 10/2009 | Nakano | H02K 29/03 |
| | | | | 310/156.38 |
| 2014/0210297 | A1 | 7/2014 | Shizu | |
| 2014/0346910 | A1* | 11/2014 | Nakano | H02K 3/28 |
| | | | | 310/156.01 |
| 2016/0156240 | A1* | 6/2016 | Shimozu | H02K 3/34 |
| | | | | 29/596 |
| 2018/0248433 | A1* | 8/2018 | Okazaki | H02K 1/146 |
| 2019/0372415 | A1 | 12/2019 | Hwang et al. | |
| 2021/0281210 | A1* | 9/2021 | Bachmann | B64D 31/18 |

FOREIGN PATENT DOCUMENTS

| | | |
|---|---|---|
| EP | 3 599 704 A1 | 1/2020 |
| JP | H0775212 A | 3/1995 |
| WO | 2020/011867 A1 | 1/2020 |

OTHER PUBLICATIONS

International Search Report and Written Opinion dated Nov. 5, 2021 corresponding to International Patent Application No. PCT/US2021/042187, 12 pages.

* cited by examiner

FAULT TOLERANT REDUNDANT ELECTRIC MOTOR

TECHNICAL FIELD

The present disclosure relates generally to the field of electric motors, and more particularly to an improved electric motor stator assembly.

BACKGROUND ART

Generally, a brushless DC motor comprises a rotor and a stator having electrical windings (typically insulated copper windings) that are wound in a stator core. The rotor rotates relative to the stator due to magnetic forces generated by the energized coils in the stator. The rotor is generally comprised of a shaft and permanent magnets. When the windings are energized, a magnetic field is formed that interacts with the magnetic field of the permanent magnet of the rotor in a manner such that torque and subsequent rotation is produced in the rotor. The stator is often cylindrical in shape and the rotor is placed within the stator and held in place by endplates and bearings. A radial air gap is provided between the outer surface of the rotor and the inner surface of the stator. Normally the stator is stationary and drives the rotor. However, it is possible to make the rotor stationary and have the stator drive itself relative to the rotor. Electric current is introduced into the windings of the stator such that the stator's core material forms a magnetic path for a magnetic field that stimulates rotation relative to the stator.

Stators can be formed of thin laminations of high permeability material comprised of a number of alternating teeth and slots that form the inner circumference of the cylinder and an outer yoke material that holds the teeth in position. Insulated electrical windings are then placed in the slots alongside the teeth to form the magnetic field when a current is introduced into the windings. The purpose of the stator coils is to generate magnetic flux that interacts with the permanent magnets of the rotor. Thus, a conventional rotary motor includes a generally cylindrical outer stator core, stator windings wound within the stator core, and an inner rotor having permanent magnets and that rotates about a center axis relative to the stator core so as to provide rotary motion by means of interaction with the magnetic field of the stator.

BRIEF SUMMARY

With parenthetical reference to corresponding parts, portions or surfaces of the disclosed embodiments, merely for the purposes of illustration and not by way of limitation, an electric motor assembly (115) is provided comprising: a stator (118); a rotor (119) mounted for movement about a longitudinal axis (120) relative to the stator (118); the rotor (119) comprising at least one permanent magnet (121); a radial air gap (122) between the stator (118) and the rotor (119); the stator (118) comprising a plurality of circumferentially spaced stator teeth (123) orientated radially about the longitudinal axis (120) and extending axially along the longitudinal axis (120); the stator (118) comprising a plurality of circumferentially spaced stator slots (1-39) orientated radially about the longitudinal axis (120) and extending axially along the longitudinal axis (120) between the plurality of stator teeth (123); the stator (118) comprising a first electromagnetic winding (130) disposed in a first slot set (2-19) of the plurality of stator slots (1-39) and operatively configured to be selectively energized to exert a torque on the rotor (119); the stator (118) comprising a second electromagnetic winding (230) disposed in a second slot set (23-39/1) of the plurality of stator slots (1-39) separate from the first slot set (2-19) and operatively configured to be selectively energized to exert a torque on the rotor (119) separate from the first electromagnetic winding (130); a first motor drive (160) operatively configured to control the first electromagnetic winding (130); a second motor drive (260) operatively configured to control the second electromagnetic winding (230); the first electromagnetic winding (130) comprising a first coil (131, 136, 140, 145) disposed in a first pair of slots (2/5, 3/6, 15/18, 16/19) in the first slot set (2-19) of the plurality of stator slots (1-39) and a second coil (132, 137, 139, 144) disposed in a second pair of slots (5/8, 6/9, 12/15, 13/16) in the first slot set (2-19) of the plurality of stator slots (1-39); the first coil (131, 136, 140, 145) of the first electromagnetic winding (130) comprising a first number of turns (9T, 14T, 14T, 9T) in the first pair of slots (2/5, 3/6, 15/18, 16/19) in the first slot set (2-19) of the plurality of stator slots (1-39); the second coil (132, 137, 139, 144) of the first electromagnetic winding (130) comprising a second number of turns (19T, 19T, 19T, 19T) in the second pair of slots (5/8, 6/9, 12/15, 13/16) in the first slot set (2-19) of the plurality of stator slots (1-39) that is greater than the first number of turns (9T, 14T, 14T, 9T) in the first pair of slots (2/5, 3/6, 15/18, 16/19) in the first slot set (2-19) of the plurality of stator slots (1-39); the second electromagnetic winding (230) comprising a third coil (231, 236, 240, 245) disposed in a third pair of slots (23/26, 24/27, 36/39, 37/1) in the second slot set (23-39/1) of the plurality of stator slots (1-39) and a fourth coil (232, 237, 239, 244) disposed in a fourth pair of slots (26/29, 27/30, 33/36, 34/37) in the second slot set (23-39/1) of the plurality of stator slots (1-39); the third coil (231, 236, 240, 245) of the second electromagnetic winding (230) comprising a third number of turns (9T, 14T, 14T, 9T) in the third pair of slots (23/26, 24/27, 36/39, 37/1) in the second slot set (23-39/1) of the plurality of stator slots (1-39); and the fourth coil (232, 237, 239, 244) of the second electromagnetic winding (230) comprising a fourth number of turns (19T, 19T, 19T, 19T) in the fourth pair of slots (26/29, 27/30, 33/36, 34/37) in the second slot set (23-39/1) of the plurality of stator slots (1-39) that is greater than the third number of turns (9T, 14T, 14T, 9T) in the third pair of slots (23/26, 24/27, 36/39, 37/1) in the second slot set (23-39/1) of the plurality of stator slots (1-39).

The first coil (131) of the first electromagnetic winding (130) with the first number of turns (9T) in the first pair of slots (2/5) in the first slot set (2-19) may be disposed circumferentially between the second coil (132) of the first electromagnetic winding (130) with the second number of turns (19T) in the second pair of slots (5/8) in the first slot set (2-19) and the third coil (245) of the second electromagnetic winding (230) with the third number of turns (9T) in the third pair of slots (37/1) in the second slot set (23-39/1). The third coil (245) of the second electromagnetic winding (230) with the third number of turns (9T) in the third pair of slots (37/1) in the second slot set (23-39/1) may be disposed circumferentially between the first coil (131) of the first electromagnetic winding (130) with the first number of turns (9T) in the first pair of slots (2/5) in the first slot set (2-19) and the fourth coil (244) of the second electromagnetic winding (230) with the fourth number of turns (19T) in the fourth pair of slots (34/37) in the second slot set (23-39/1).

The first number of turns (9T) in the first pair of slots (2/5) in the first slot set (2-19) may be equal to the third number of turns (9T) in the third pair of slots (37/1) in the second slot set (23-39/1), and the second number of turns (19T) in the second pair of slots (5/8) in the first slot set (2-19) may be equal to the fourth number of turns (19T) in the fourth pair of slots (34/37) in the second slot set (23-39/1). The first pair of slots (2/5) in the first slot set (2-19) may comprise a first slot (2) and a second slot (5), and the second pair of slots (5/8) in the first slot set (2-19) may comprise the second slot (5) in the first slot set (2-19) and a third slot (8) in the first slot set (2-19).

The first electromagnetic winding (130) may comprise a first phase (B1), a second phase (A1) and a third phase (C1), and the second electromagnetic winding (230) may comprise a fourth phase (B2), a fifth phase (A2) and a sixth phase (C2). The first phase (B1) of the first electromagnetic winding (130) may comprise the first coil (131) in the first pair of slots (2/5) in the first slot set (2-19) and the second coil (132) in the second pair of slots (5/8) in the first slot set (2-19). The fourth phase (B2) of the second electromagnetic winding (230) may comprise the third coil (231) in the third pair of slots (23/26) in the second slot set (23-39/1) and the fourth coil (232) in the fourth pair of slots (26/29) in the second slot set (23-39/1). The second phase (A1) of the first electromagnetic winding (130) may comprise a fifth coil (136) in a fifth pair of slots (3/6) in the first slot set (2-19) and a sixth coil (137) in a sixth pair of slots (6/9) in the first slot set (2-19). The fifth coil (136) of the first electromagnetic winding (130) may comprise a fifth number of turns (14T) in the fifth pair of slots (3/6) in the first slot set (2-19) and the sixth coil (137) of the first electromagnetic winding (130) may comprise a sixth number of turns (19T) in the sixth pair of slots (6/9) in the first slot set (2-19) that is greater than the fifth number of turns (14T) in the fifth pair of slots (3/6) in the first slot set (2-19). The fifth phase (A2) of the second electromagnetic winding (230) may comprise a seventh coil (236) in a seventh pair of slots (24/27) in the second slot set (23-39/1) and an eighth coil (237) in an eighth pair of slots (27/30) in the second slot set (23-39/1). The seventh coil (236) of the second electromagnetic winding (230) may comprise a seventh number of turns (14T) in the seventh pair of slots (24/27) in the second slot set (23-39/1) and the eighth coil (237) of the second electromagnetic winding (230) may comprise an eighth number of turns (19T) in the eighth pair of slots (27/30) in the second slot set (23-39/1) that is greater than the seventh number of turns (14T) in the seventh pair of slots (24/27) in the second slot set (23-39/1). The third phase (C1) of the first electromagnetic winding (130) may comprise a ninth coil (145) in a ninth pair of slots (16/19) in the first slot set (2-19) and a tenth coil (144) in a tenth pair of slots (13/17) in the first slot set (2-19). The ninth coil (145) of the first electromagnetic winding (130) may comprise a ninth number of turns (9T) in the ninth pair of slots (16/19) in the first slot set (2-19) and the tenth coil (144) of the first electromagnetic winding (130) may comprise a tenth number of turns (19T) in the tenth pair of slots (16/19) in the first slot set (2-19) that is greater than the ninth number of turns (19T) in the ninth pair of slots (16/19) in the first slot set (2-19). The sixth phase (C2) of the second electromagnetic winding (230) may comprise an eleventh coil (245) in an eleventh pair of slots (37/1) in the second slot set (23-39/1) and a twelfth coil (244) in a twelfth pair of slots (34/37) in the second slot set (23-39/1). The eleventh coil (245) of the second electromagnetic winding (230) may comprise an eleventh number of turns (9T) in the eleventh pair of slots (37/1) in the second slot set (23-39/1) and the twelfth coil (244) of the second electromagnetic winding (230) may comprise a twelfth number of turns (19T) in the twelfth pair of slots (34/37) in the second slot set (23-39/1) that is greater than the eleventh number of turns (9T) in the eleventh pair of slots (37/1) in the second slot set (23-39/1).

The stator (118) may comprise a winding-empty slot (20-22) disposed circumferentially between the first electromagnetic winding (130) in the first slot set (2-19) of the plurality of stator slots (1-39) and the second electromagnetic winding (230) in the second slot set (23-39/1) of the plurality of stator slots (1-39). The stator (118) may comprise a second winding-empty slot disposed circumferentially between the first electromagnetic winding (130) in the first slot set (2-19) of the plurality of stator slots (1-39) and the second electromagnetic winding (230) in the second slot set (23-39/1) of the plurality of stator slots (1-39).

The stator slots of the first slot set (2-19) may be disposed circumferentially adjacent each other, and the stator slots of the second slot set (23-39/1) may be disposed circumferentially adjacent each other. A first end stator slot (2) of the first slot set (2-19) may be disposed circumferentially adjacent a second end stator slot (1) of the second slot set (23-39/1).

The first electromagnetic winding (130) may comprise three or more electrical phases (A1/B1/C1) and a current that is passed through the first electromagnetic winding (130) in a given stator slot (5) of the first slot set (2-19) may be not of the same electrical phase as the current that is passed through the first electromagnetic winding (130) in a stator slot (4, 6) of the first slot set (2-19) that is adjacent the given stator slot (5).

The stator slots in the first slot set (2-19) may disposed circumferentially in a first semicircle or first minor arc (125) about the longitudinal axis (120) and the stator slots in the second slot set (23-39/1) may be disposed circumferentially in a second semicircle or second minor arc (126) about the longitudinal axis (120) separate from the first semicircle or first minor arc (125) about the longitudinal axis (120). The stator slots in the first slot set (2-19) may be disposed circumferentially on a first side of a diameter center plane (124) through the longitudinal axis (120) and the stator slots in the second slot set (23-39/1) may be disposed circumferentially on a second side of the diameter center plane (124) through the longitudinal axis (120).

The electric motor assembly (115) may comprise a first power source (163) connected to said first motor drive (160) and configured to power said first electromagnetic winding (130) and a second power source (263) connected to said second motor drive (260) and configured to power said second electromagnetic winding (230). The first power source (163) may comprise a three phase AC power supply. The second power source (263) may comprise a capacitor or a battery. The second motor drive (260) may be configured to operate a common DC bus such that energy from said first power source (163) is used to charge said second power source (263) when said second power source (263) is not fully charged.

DETAILED DESCRIPTION OF THE EMBODIMENTS

Figure 1:
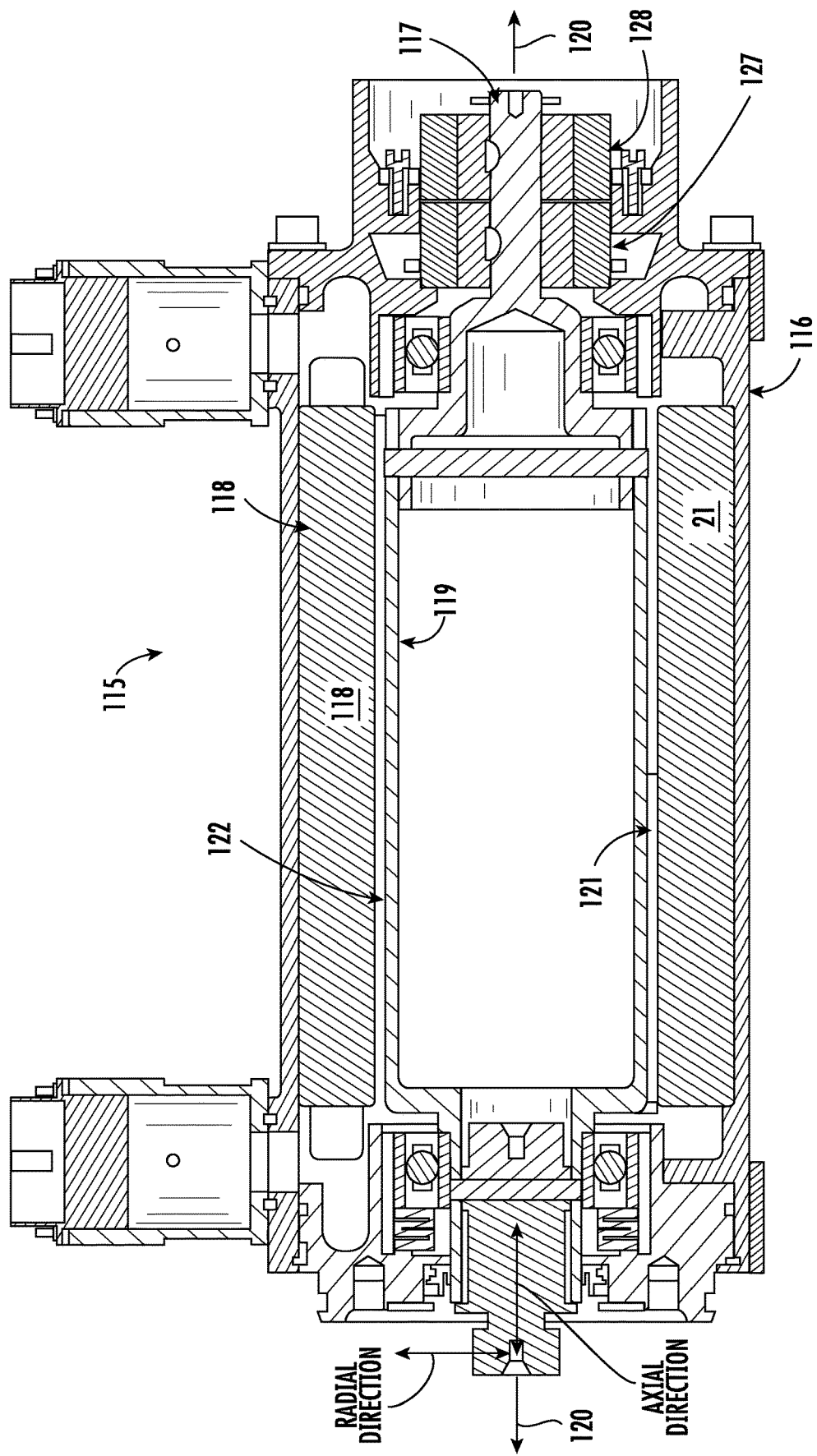
FIG. 1 is a longitudinal sectional view of a first embodiment of the electric motor assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, the present disclosure broadly provides a fault tolerant motor assembly, of which an embodiment is indicated at 115. As shown, motor 115 generally includes outer housing 116 supporting stator 118 and rotor 119. In this embodiment, motor 115 is a brushless variable-speed permanent magnet motor that is supplied with a current and includes position sensor 127 and 128 feedback to monitor common rotor 119 angle about axis 120 which is used for closed loop motion control. Motor 115 has inner common rotor 119 with permanent magnets 121 and fixed non-rotating common stator stack 118 with independent first winding 130 isolated from independent second winding 230. Rotor 119 includes external magnets 121 facing radially extending stator teeth 123 of stator 118 across radial air gap 122. Rotor 119 is configured to selectively rotate about axis of rotation 120 relative to stator 118 and housing 116. Stator 118 does not rotate relative to housing 116. When current is appropriately applied through the windings of stator 119, a magnetic field is induced. The magnetic field interaction between stator 118 and rotor 119 generates torque which may rotate rotor 119, which is connected via shaft 117 and a mechanical linkage so as to rotationally or linearly drive a movable object. The linkage may contain gears, a ballscrew or other similar devices. For example, and without limitation, the linkage may comprise a ballscrew for converting rotary motion into linear motion to provide a linear stroke. A gear train may be used to provide a mechanical advantage to the torque produced by motor 115 or no gears may be used as alternatives.

In order to control motor 115 in normal operation, electronic controller 129, via independent motor drivers 160 and 260, selectively distributes power from separate and independent power sources 163 and 263 to 3-phase windings 130 and 230, respectively, such that a rotating magnet field is produced by the subject stator windings. Motor 115 includes position sensor 127 and position sensor 128 for determining the angular position of rotor 119. With the feedback information provided by sensor 127 and sensor 128, the position of rotor 119 is known and by this the position of the permanent magnets 121 of rotor 119. With this knowledge motor controller 129 can generate the rotating magnetic field so that electric motor 115 rotates at the desired speed and torque. Drive electronics 160, based on position sensor 127 angular position feedback received by controller 172, generates and commutates the stator fields via first motor winding 130 to vary the speed and direction of rotor 119. Drive electronics 260, based on position sensor 128 angular position feedback received by controller 272, may also generate and commutate the stator fields via second motor winding 230 to vary the speed and direction of rotor 119. Accordingly, motor 115 will selectively apply a torque on rotor 119 in one direction about axis 120 at varying speeds and will apply a torque on rotor 119 in the opposite direction about axis 120 at varying speeds. Rotor 119 is thereby mounted for movement about longitudinal axis 120 relative to stator 118 with radial air gap 122 between stator 118 and rotor 119.

In the embodiment shown, position sensors 127 and 128 are resolvers. However, an encoder, a Linear Variable Differential Transformer ("LVDT"), or other similar device may be used as alternatives. A position sensor may be any electrical device for measuring the position, or a derivative of position, or distance from an object, examples of which include an encoder, a resolver, a linear variable differential transformer, a variable resistor, a variable capacitor, a laser rangefinder, an ultrasonic range detector, an infrared range detector, or other similar devices. Sensorless commutation techniques may also be used as alternatives, examples of which include backward electromotive force (EMF) observers, saliency-based techniques, and other similar approaches.

Figure 2:
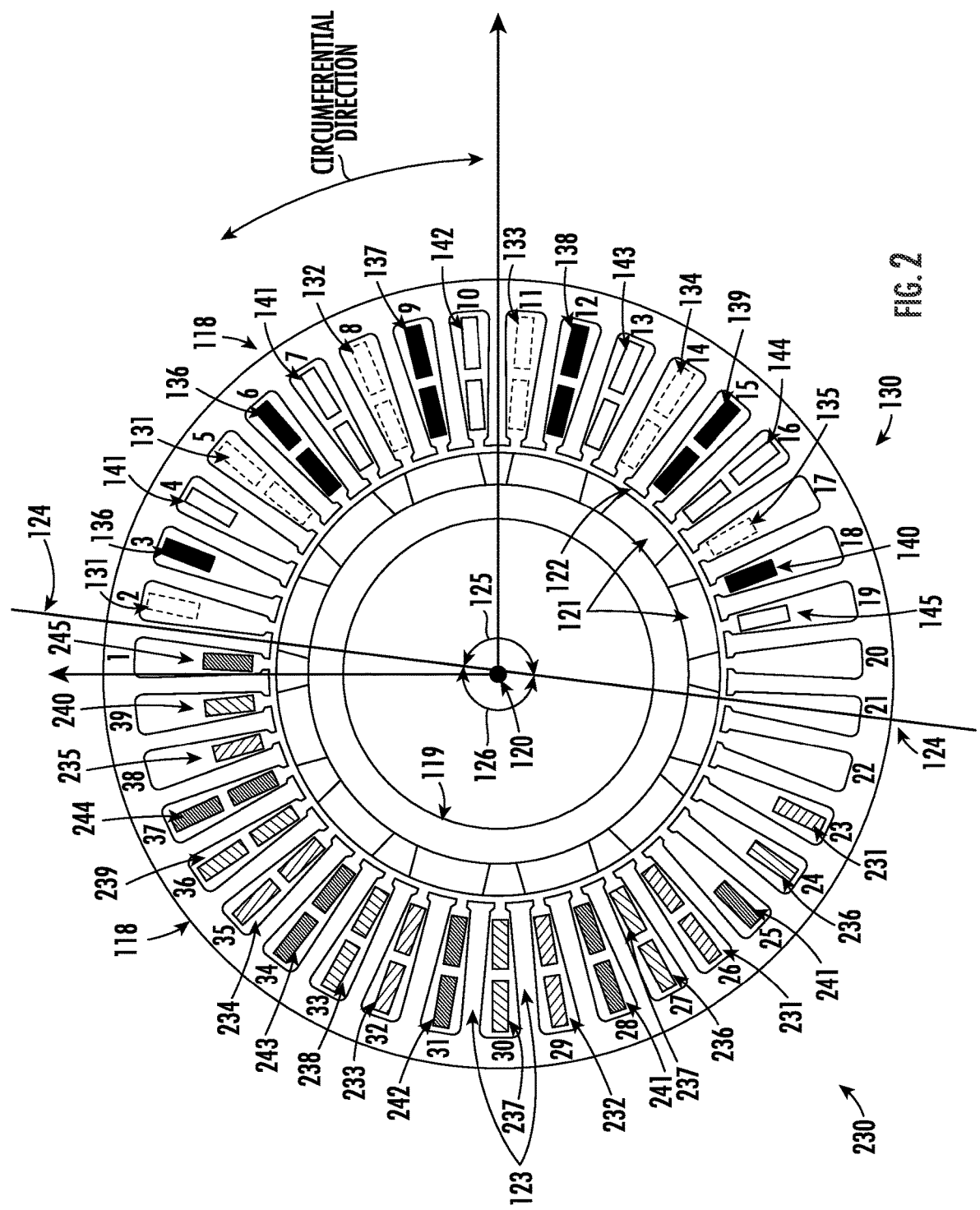
FIG. 2 is a transverse sectional and partial schematic view of the stator and rotor shown in FIG. 1.

As shown in FIGS. 1 and 2, stator 118 is a hollow cylindrical member comprising thirty-nine circumferentially spaced stator teeth 123 that extending radially inwardly about longitudinal axis 120 and that are equally spaced circumferentially about longitudinal axis 120. Stator teeth 123 also extending axially along longitudinal axis 120 opposite the length of rotor 119. Stator teeth 123 define a plurality of circumferentially spaced stator slots 1-39 therebetween. Stator slots 1-39 are orientated radially about longitudinal axis 120 and are equally spaced circumferentially about axis 120 between stator teeth 123. Stator slots 1-39 also extend axially along longitudinal axis 120 between stator teeth 123. While a thirty-nine-slot motor is shown and described in this embodiment, motors with different numbers of slots could be used as alternatives, including without limitation a motor with an even number of slots.

Figure 3:
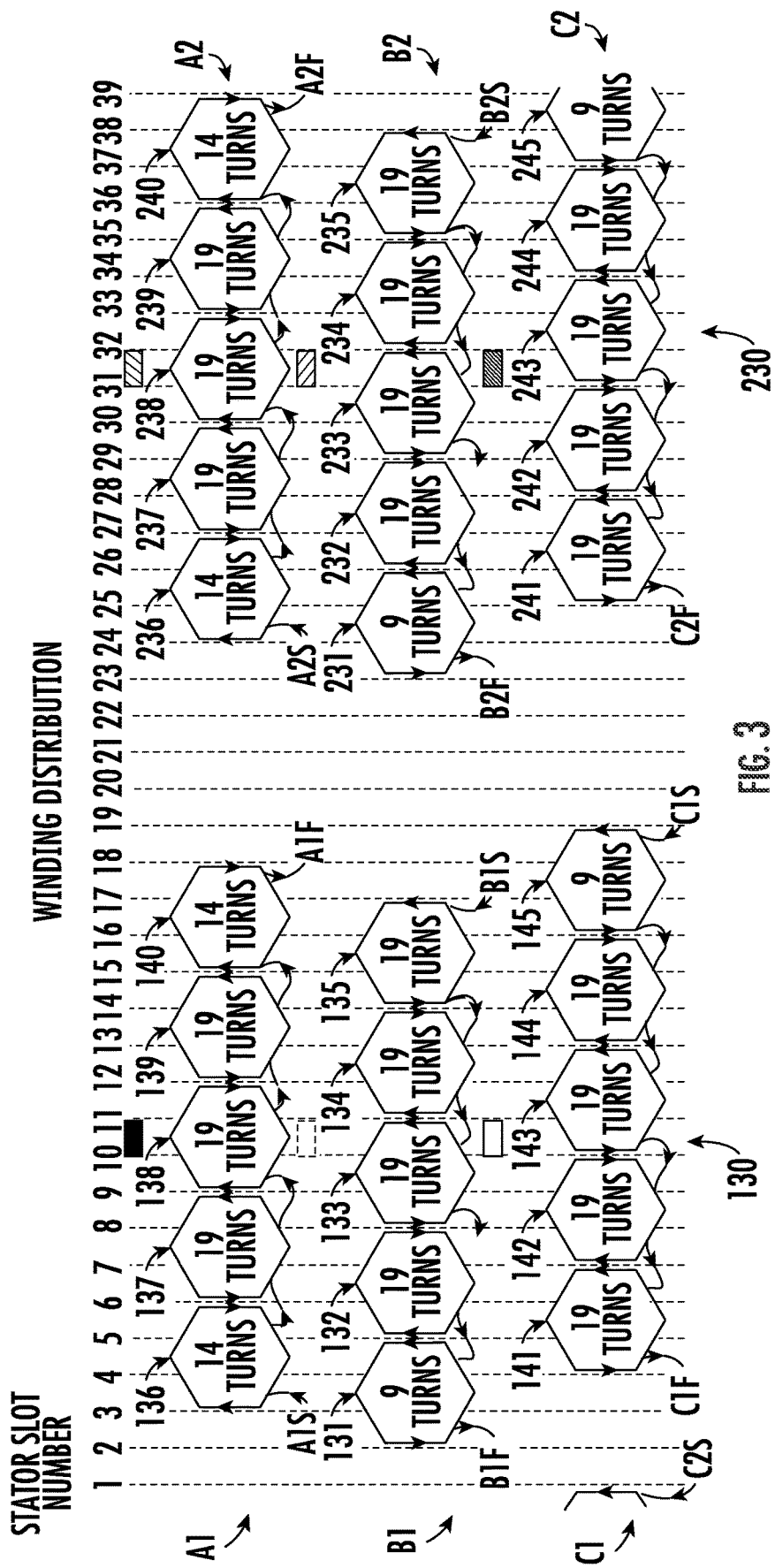
FIG. 3 is a winding distribution diagram of the stator shown in FIG. 2.

As shown in FIGS. 2-3, stator 118 has two electrically separate and isolated windings 130 and 230. Winding 130 is coiled in slots 2-19 and comprises three phases A1, B1 and C1 with five coils for each phase. Phase A1 comprises coils 136, 137, 138, 139 and 140. Phase B1 comprises coils 131, 132, 133, 134 and 135. Phase C1 comprises coils 141, 142, 143, 144 and 145. The coil slot starts, direction of coil and number of turns are also shown in FIG. 3 for each phase.

As shown, phase A1 is coiled in slots 3, 6, 9, 12, 15 and 18. Coil 136 in paired slots 3 and 6 has fourteen turns. Coil 137 in paired slots 6 and 9 has nineteen turns. Coil 138 in paired slots 9 and 12 has nineteen turns. Coil 139 in paired slots 12 and 15 has nineteen turns. Coil 140 in paired slots 15 and 18 has fourteen turns.

Phase B1 is coiled in slots 2, 5, 8, 11, 14 and 17. Coil 131 in paired slots 2 and 5 has nine turns. Coil 132 in slots 5 and 8 has nineteen turns. Coil 133 in paired slots 8 and 11 has nineteen turns. Coil 134 in paired slots 11 and 14 has nineteen turns. Coil 135 in paired slots 14 and 17 has nineteen turns.

Phase C1 is coiled in slots 4, 7, 10, 13, 16 and 19. Coil 141 in paired slots 4 and 7 has nineteen turns. Coil 142 in paired slots 7 and 10 has nineteen turns. Coil 143 in paired slots 10 and 13 has nineteen turns. Coil 144 in paired slots 13 and 16 has nineteen turns. Coil 145 in paired slots 16 and 19 has nine turns.

As shown, winding 230 is coiled in slots 22-39 and 1. Winding 230 comprises three phases A2, B2 and C2 with five coils for each phase. Phase A2 comprises coils 236, 237, 238, 239 and 240. Phase B2 comprises coils 231, 232, 233, 234 and 235. Phase C2 comprises coils 241, 242, 243, 244 and 245. The coil slot starts, direction of coil and number of turns are also shown in FIG. 3 for each phase.

Phase A2 is coiled in slots 24, 27, 30, 33, 36 and 39. Coil 236 in paired slots 24 and 27 has fourteen turns. Coil 237 in paired slots 27 and 30 has nineteen turns. Coil 238 in paired slots 30 and 33 has nineteen turns. Coil 239 in paired slots 33 and 36 has nineteen turns. Coil 240 in slots 36 and 39 has fourteen turns.

Phase B2 is coiled in slots 23, 26, 29, 32, 35 and 38. Coil 231 in paired slots 23 and 26 has 9 turns. Coil 232 in paired slots 26 and 29 has nineteen turns. Coil 233 in paired slots 29 and 32 has nineteen turns. Coil 234 in paired slots 32 and 35 has nineteen turns. Coil 235 in paired slots 35 and 38 has nineteen turns.

Phase C2 is coiled in slots 25, 28, 31, 34, 37 and 1. Coil 241 in paired slots 25 and 28 has nineteen turns. Coil 242 in paired slots 28 and 31 has nineteen turns. Coil 243 in paired slots 31 and 34 has nineteen turns. Coil 244 in paired slots 34 and 37 has nineteen turns. Coil 245 in paired slots 37 and 1 has nine turns.

Accordingly, electromagnetic winding 130 is disposed in a first slot set 2-19 of stator slots 1-39 and is operatively configured to be selectively energized to exert a torque on the rotor 119. Electromagnetic winding 230 is disposed in a second slot set 23-39 and 1 of stator slots 1-39 that is physically separate from the first slot set 2-19. Although motor 115 has a single common laminated stator stack, windings 130 and 230 do not share any of slots 1-39 in stator 118. Electromagnetic winding 130 and 230 are operatively configured to be selectively energized to exert a torque on the rotor 119 independently from each other.

As shown, the stator slots in first slot set 2-19 are orientated circumferentially in a semicircle or minor arc 125 about longitudinal axis 120 and the stator slots in second slot set 23-39 and 1 are orientated circumferentially in semicircle or minor arc 126 about longitudinal axis 120 separate from semicircle 125. The stator slots in first slot set 2-19 are positioned circumferentially on a first side of diameter center plane 124 through longitudinal axis 120 and the stator slots in second slot set 23-39 and 1 are positioned circumferentially on a second side of diameter center plane 124 through longitudinal axis 120.

With respect to slot set 2-19 of winding 130, as shown, the number of turns through slot 2 of slot set 2-19, which is most adjacent to diameter center plane 124 separating winding 130 from winding 230 at one end of winding 130, is less than the number of turns through any of slots 3-18. Similarly, the number of turns through slot 19 of slot set 2-19, which is most adjacent to diameter center plane 124 separating winding 130 from winding 230 at the second end of winding 130, is also less than the number of turns through any of slots 3-18 and at nine turns is equal to the number of turns through slot 2. Moving to the penultimate end slots of slot set 2-19 of winding 130, the number of turns through slot 3, which is second most adjacent to diameter center plane 124 separating winding 130 from winding 230 at the first end of winding 130, is less than the number of turns through any of slots 4-17. Similarly, the number of turns through slot 18, which is second most adjacent to diameter center plane 124 separating winding 130 from winding 230 at the second end of winding 130, is also less than the number of turns through any of slots 4-17 and at fourteen turns is equal to the number of turns through slot 3. Moving the next step circumferentially away from diameter center plane 124 separating winding 130 from winding 230, the number of turns through slot 4, which is third most adjacent to diameter center plane 124 separating winding 130 from winding 230 at the first end of winding 130, is less than the number of turns through any of slots 5-16. Similarly, the number of turns through slot 17, which is third most adjacent to diameter center plane 124 separating winding 130 from winding 230 at the second end of winding 130, is also less than the number of turns through any of slots 5-16 and at nineteen turns is equal to the number of turns through slot 4. Moving the next step circumferentially away from diameter center plane 124 separating winding 130 from winding 230, the number of turns through slot 5, which is fourth most adjacent to diameter center plane 124 separating winding 130 from winding 230 at the first end of winding 130, is less than the number of turns through any of slots 6-15. Similarly, the number of turns through slot 16, which is fourth most adjacent to diameter center plane 124 separating winding 130 from winding 230 at the second end of winding 130, is also less than the number of turns through any of slots 6-15 and at twenty-eight turns is equal to the number of turns through slot 5. Moving the next step circumferentially away from diameter center plane 124 separating winding 130 from winding 230, the number of turns through slot 6, which is fifth most adjacent to diameter center plane 124 separating winding 130 from winding 230 at the first end of winding 130, is less than the number of turns through any of slots 7-14. Similarly, the number of turns through slot 15, which is fifth most adjacent to diameter center plane 124 separating winding 130 from winding 230 at the second end of winding 130, is also less than the number of turns through any of slots 7-14 and at thirty-three turns is equal to the number of turns through slot 6. The remaining slots 7-14 each contain thirty-eight turns.

With respect to slot set 23-39 and 1 of winding 230, as shown, the number of turns through slot 1 of slot set 23-39 and 1, which is most adjacent to diameter center plane 124 separating winding 230 from winding 130 at one end of winding 230, is less than the number of turns through any of slots 24-39. Similarly, the number of turns through slot 23 of slot set 23-39 and 1, which is most adjacent to diameter center plane 124 separating winding 230 from winding 130 at the second end of winding 230, is also less than the number of turns through any of slots 24-39 and at nine turns is equal to the number of turns through slot 1. Moving to the penultimate end slots of slot set 23-39 and 1 of winding 230, the number of turns through slot 39, which is second most adjacent to diameter center plane 124 separating winding 230 from winding 130 at the first end of winding 230, is less than the number of turns through any of slots 25-38. Similarly, the number of turns through slot 24, which is second most adjacent to diameter center plane 124 separating winding 230 from winding 130 at the second end of winding 230, is also less than the number of turns through any of slots 25-38 and at fourteen turns is equal to the number of turns through slot 39. Moving the next step circumferentially away from diameter center plane 124 separating winding 230 from winding 130, the number of turns through slot 38, which is third most adjacent to diameter center plane 124 separating winding 230 from winding 130 at the first end of winding 230, is less than the number of turns through any of slots 26-37. Similarly, the number of turns through slot 25, which is third most adjacent to diameter center plane 124 separating winding 230 from winding 130 at the second end of winding 230, is also less than the number of turns through any of slots 26-37 and at nineteen turns is equal to the number of turns through slot 38. Moving the next step circumferentially away from diameter center plane 124 separating winding 230 from winding 130, the number of turns through slot 37, which is fourth most adjacent to diameter center plane 124 separating winding 230 from winding 130 at the first end of winding 230, is less than the number of turns through any of slots 27-36. Similarly, the number of turns through slot 26, which is fourth most adjacent to diameter center plane 124 separating winding 230 from winding 130 at the second end of winding 230, is also less than the number of turns through any of slots 27-36 and at twenty-eight turns is equal to the number of turns through slot 37. Moving the next step circumferentially away from diameter center plane 124 separating winding 230 from winding 130, the number of turns through slot 36, which is fifth most adjacent to diameter center plane 124 separating winding 230 from winding 130 at the first end of winding 230, is less than the number of turns through any of slots 28-35. Similarly, the number of turns through slot 27, which is fifth most adjacent to diameter center plane 124 separating winding 230 from winding 130 at the second end of winding 230, is also less than the number of turns through any of slots 28-35 and at thirty-three turns is equal to the number of turns through slot 36. The remaining slots 28-35 each contain thirty-eight turns.

Thus, the number of turns in adjacent slots 1 and 2 on each side of center plane 124 separating winding 230 from winding 130 are reduced. Similarly, the number of turns in slots 19 and 23 on each side of center plane 124 separating winding 230 from winding 130 are reduced. And in this embodiment, as shown, slots 20, 21 and 22 are empty and do not contain any coil windings. With an odd number of total slots and therefore center plane 124 extending through slot 21 in this embodiment, the number of turns in adjacent slots 20 and 22 on each side of center plane 124 separating winding 230 from winding 130 is reduced to zero.

As indicated, in this embodiment the coil turn reduction is gradually reduced in slots 6, 5, 4, 3 and 2 closest center plane 124 on one end of winding 130, is gradually reduced in slots 36, 37, 38, 39 and 1 closest center plane 124 on one end of winding 230, is gradually reduced in slots 15, 16, 17, 18, 19 and 20 closest center plane 124 on the second end of winding 130, and is gradually reduced in slots 27, 26, 25, 24, 23 and 22 closest center plane 124 on the second end of winding 230. This reduced slot turn count where windings 130 and 230 are circumferentially the closest, electrically isolates windings 130 and 230 from each other. Empty slots 20, 21 and 22 positioned circumferentially between winding 130 and winding 230 further assist in electrically isolating winding 130 and winding 230 from each other.

While this embodiment shows winding 130 and winding 230 as each having three phases, such windings may alternatively have more or less than three phases. In addition, the number of phases in windings 130 and 230 may differ from each other. The number of stator slots may be varied, the number of coils and turns of each the isolated windings may be varied and may differ from each other, and the amount of the reduction in turns circumferentially approaching the separation plane 124 and the rate of such reduction may also be varied and may differ between windings. For example, in addition to adjacent slots on each side of center plane 124 separating a first end of winding 130 from a first end of winding 230 being empty, as shown with slots 20, 21 and 22 of the embodiment shown in FIG. 2, the adjacent slots on each side of center plane 124 separating a second end of winding 130 from a second end of winding 230 may also be empty and not contain any coil windings to further assist in physically and electrically isolating or segregating winding 130 and winding 230 from each other. While motor 115 is shown having two separate and isolated windings 130 and 230, more than two separate and isolated windings may be employed as an alternative with additional diameter center planes separating such additional windings.

Figure 4:
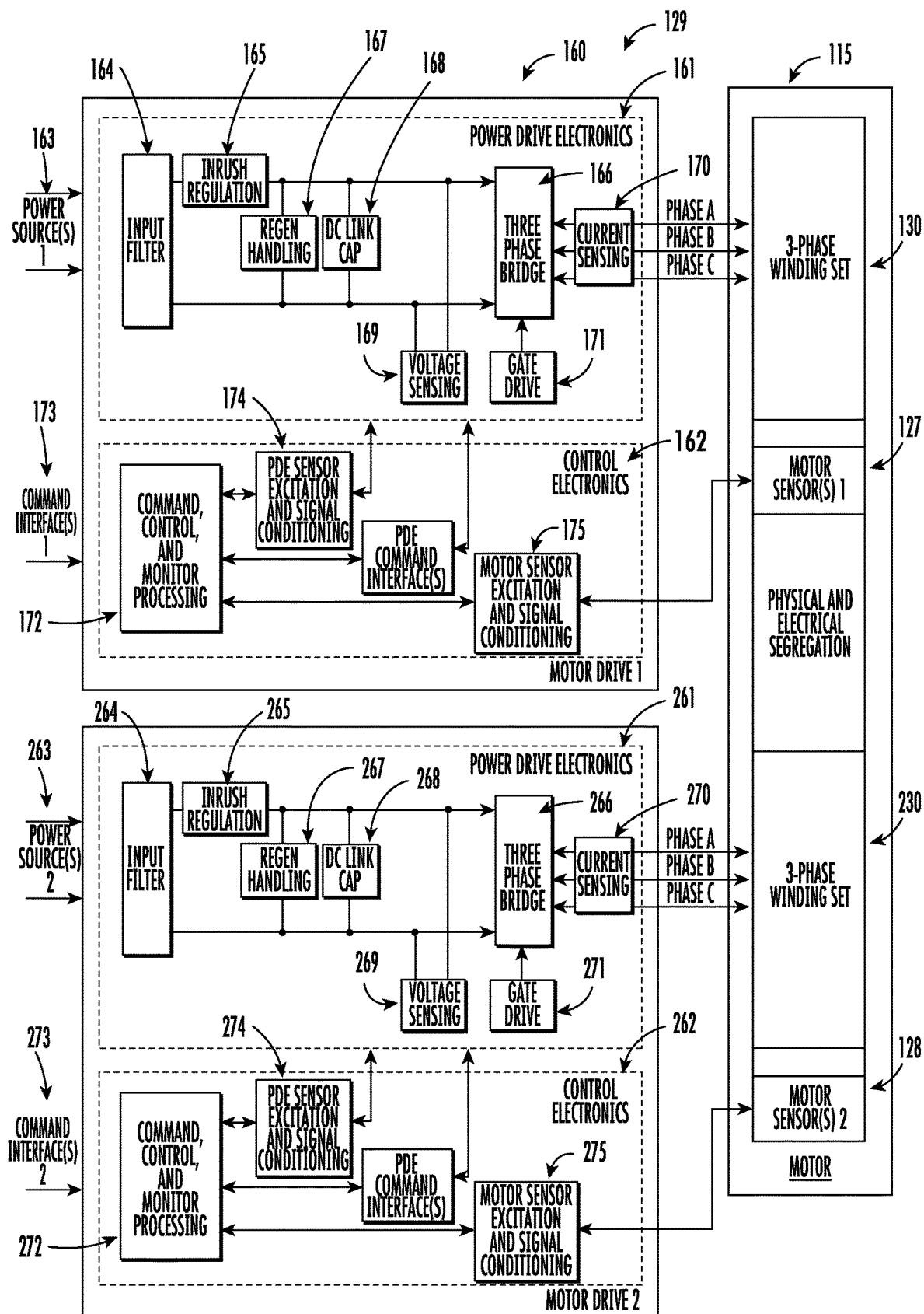
FIG. 4 is a schematic diagram of the power drive and control electronics of the electric motor shown in FIG. 1.

As shown in FIG. 4, motor drive 160 is operatively configured to control electromagnetic winding 130 of stator 118 and motor drive 260 is operatively configured to independently control electromagnetic winding 230 of stator 118. Motor drive 160 includes power drive electronics 161 and control electronics 162 and is operable to control pulse-width modulation (PWM) of winding 130 to power electric motor 115 and generate and commutate the stator fields to vary the speed and direction of electric motor 115 utilizing angular position feedback from motor position sensor 127.

Power drive electronics 161 controls flow of power to winding 130 and converts power from power source 163 into current that drives winding 130 in phases A1, B1 and C1. Power drive electronics 161 receive electrical power from power source 163 via input filter 164. In an embodiment, input filter 164 has a common mode filter stage and a differential mode filter stage and is operable to reduce high frequency electronic noise and ensure power source 163 sees a steady current draw. Filter 164 may also be used to ensure that power supplies comply with government regulations and agency standards. Input filter 164 is in electrical communication with inrush regulator 165, which limits the current during this period to protect the electronic circuitry. In an embodiment, inrush regulator 165 may include one or more thermistors and a transformer switching relay. Inrush regulator 165 is in electrical communication with three phase bridge 166. Three phase bridge 166 is an inverter operable to convert direct current to alternating current via active switching elements (e.g., IGBT's). The switching elements are electrically connected to the winding 130, and PWM of winding 130 generates torque on rotor 119.

Regenerated energy circuit 167 and DC link capacitor 168 are located in parallel with the input filter 164 and three phase bridge 166. When the current to winding 130 is zero and electric motor 115 experiences a backward electromotive force (EMF) higher than the output voltage of motor drive 160, current is directed into motor drive 160 and regenerated energy circuit 167 is operable to recover or dissipate such energy. The recovered energy is returned to DC link capacitor 168. DC link capacitor 168 is operable to reduce the ripple of the DC voltage input to three phase bridge 166.

Voltage sensors 169 and current sensors 170 provide feedback signals to control electronics 162. The PWM signals are adjusted as a function of the feedback signals from voltage sensors 169 and current sensors 170. In this embodiment, power drive electronics 161 also include gate driver 171 in electrical communication with control electronics 162 and three phase bridge 166. Gate driver 171 is an interface between control electronics 162 and three phase bridge 166 and produces high-current input to the switching elements.

Control electronics 162 communicate with drive electronics 161 and include controller 172. Controller 172 is a digital device which has output lines that are a logic function of its input lines, examples of which include a microprocessor, microcontroller, field programmable gate array, programmable logic device, application specific integrated circuit, or other similar device. Controller 172 includes data sampling and storage mechanisms for receiving and storing sensory data and data storage for storing operational parameters as well as sensory data logs. Controller 172 is configured to perform a variety of computer-implemented functions such as performing method steps, calculations and the like and storing relevant data as disclosed herein. For communicating with various sensors, a sensor interface permits signals transmitted from the sensors to be converted into signals that can be understood and processed by processor 172. The sensors may be coupled to the sensor interface via a wired connection. In other embodiments they may be coupled to the sensor interface via a wireless connection. During active operation of electric motor 115, controller 172 provides PWM signals to three phase bridge 166 to produce a desired drive current signal for each terminal of winding 130. Controller 172 receives external motor control commands via command interface 173 and includes an input to receive the output signals of voltage sensors 169, current sensors 170, and motor position sensor 127. Controller 172 memory stores the values for several operating variables including a power source threshold.

Control electronics 162 include voltage/current sensor excitation and signal conditioning circuit 174 and motor position sensor excitation and signal conditioning circuit 175. Conditioning circuits 174 and 175 convert and amplify the received signals into a controller compatible form.

As also shown in FIG. 4, and similar to motor drive 160, motor drive 260 includes power drive electronics 261 and control electronics 262 and is operable to control pulse-width modulation (PWM) of winding 230 to power electric motor 115 and generate and commutate the stator fields to vary the speed and direction of electric motor 115 utilizing angular position feedback from motor position sensor 128.

Power drive electronics 261 controls flow of power to winding 230 and converts power from power source 263 into current that drives winding 230 in phases A2, B2 and C2. Power drive electronics 261 receive electrical power from power source 263 via input filter 264. In an embodiment, input filter 264 has a common mode filter stage and a differential mode filter stage and is operable to reduce high frequency electronic noise and ensure power source 263 sees a steady current draw. Filter 264 may also be used to ensure that power supplies comply with government regulations and agency standards. Input filter 264 is in electrical communication with inrush regulator 265, which limits the current during this period to protect the electronic circuitry. In an embodiment, inrush regulator 265 may include one or more thermistors and a transformer switching relay. Inrush regulator 265 is in electrical communication with three phase bridge 266. Three phase bridge 266 is an inverter operable to convert direct current to alternating current via active switching elements (e.g., IGBT's). The switching elements are electrically connected to the winding 230, and PWM of winding 230 generates torque on rotor 119.

Regenerated energy circuit 267 and DC link capacitor 268 are located in parallel with the input filter 264 and three phase bridge 266. When the current to winding 230 is zero and electric motor 115 experiences a backward electromotive force (EMF) higher than the output voltage of motor drive 260, current is directed into motor drive 260 and regenerated energy circuit 267 is operable to recover or dissipate braking energy. The recovered energy is returned to DC link capacitor 268. DC link capacitor 268 is operable to reduce the ripple of the DC voltage input to three phase bridge 266.

Voltage sensors 269 and current sensors 270 provide feedback signals to control electronics 262. The PWM signals are adjusted as a function of the feedback signals from voltage sensors 269 and current sensors 270. In this embodiment, power drive electronics 261 also include gate driver 271 in electrical communication with control electronics 262 and three phase bridge 266. Gate driver 271 is an interface between control electronics 262 and three phase bridge 266 and produces high-current input to the switching elements.

Control electronics 262 communicate with drive electronics 261 and include controller 272. Controller 272 is a digital device which has output lines that are a logic function of its input lines, examples of which include a microprocessor, microcontroller, field programmable gate array, programmable logic device, application specific integrated circuit, or other similar device. Controller 272 includes data sampling and storage mechanisms for receiving and storing sensory data and data storage for storing operational parameters as well as sensory data logs. Controller 272 is configured to perform a variety of computer-implemented functions such as performing method steps, calculations and the like and storing relevant data as disclosed herein. For communicating with various sensors, a sensor interface permits signals transmitted from the sensors to be converted into signals that can be understood and processed by processor 272. The sensors may be coupled to the sensor interface via a wired connection. In other embodiments they may be coupled to the sensor interface via a wireless connection. During active operation of electric motor 115, controller 272 provides PWM signals to three phase bridge 266 to produce a desired drive current signal for each terminal of winding 230. Controller 272 receives external motor control commands via command interface 273 and includes an input to receive the output signals of voltage sensors 269, current sensors 270, and motor position sensor 128. Controller 272 memory stores the values for several operating variables including a power source threshold.

Power source 163 may comprise a three phase AC power supply. Power source 263 may also comprise a three phase AC power source. Alternatively, and without limitation, one or both power sources may comprise a capacitor or a battery. One of the power sources may comprise a battery and the other power source may be configured to operate a common DC bus such that energy from such power source is used to charge the battery power source when the battery power source is not fully charged.

Control electronics 262 include voltage/current sensor excitation and signal conditioning circuit 274 and motor position sensor excitation and signal conditioning circuit 275. Conditioning circuits 274 and 275 convert and amplify the received signals into a controller compatible form.

In this embodiment, motor 115 is provided with the ability to operate even when either winding 130 or winding 230 fails, or when either motor drive 160 or motor drive 260 fails. The present design utilizes a single stator and rotor but can continue to drive one winding to operate the motor when the other winding fails. In this embodiment, in normal operation, both windings 130 and 230 and all six of the motor phases A1, B1, C1, A2, B2 and C2 may be utilized to operate motor 115. With a motor winding or phase fault, the operation of the failed motor winding is terminated, and motor 115 is operated as a three-phase motor via the other independent winding. Similarly, with a motor drive fault, the operation of the failed motor drive is terminated, and motor 115 is operated as a three-phase motor via the other independent motor drive.

Electric motor system 115 provides numerous advantages. For example, motor 115 is dual redundant and fault tolerant such that a single element failure does not prevent the motor from working. In this embodiment there must be at least two independent winding failures to stop the motor from working. Fault tolerance is provided with a reduced rotor length, a common set of magnets and less complexity in the stator assembly. The motor fault tolerance is scalable so that, for example, quadruple redundancy can be provided. The motor has negligible cross-coupling between the dual windings. Motor performance is equivalent to two fully independent synchronized torque-summed motors.

The present disclosure contemplates that many changes and modifications may be made. Therefore, while forms of the improved electric motor assembly have been shown and described, and a number of alternatives discussed, persons skilled in this art will readily appreciate that various additional changes and modifications may be made without departing from the scope of the invention, as defined and differentiated by the following claims.

What is claimed is:

1. An electric motor assembly comprising:
a stator;
a rotor mounted for movement about a longitudinal axis relative to said stator;
said rotor comprising at least one permanent magnet;
a radial air gap between said stator and said rotor;
said stator comprising a plurality of circumferentially spaced stator teeth orientated radially about said longitudinal axis and extending axially along said longitudinal axis;
said stator comprising a plurality of circumferentially spaced stator slots orientated radially about said longitudinal axis and extending axially along said longitudinal axis between said plurality of stator teeth;
said stator comprising a first electromagnetic winding disposed in a first slot set of said plurality of stator slots and operatively configured to be selectively energized to exert a torque on said rotor;
said stator comprising a second electromagnetic winding disposed in a second slot set of said plurality of stator slots separate from said first slot set and operatively configured to be selectively energized to exert a torque on said rotor separate from said first electromagnetic winding;
a first motor drive operatively configured to control said first electromagnetic winding;
a second motor drive operatively configured to control said second electromagnetic winding;
said first electromagnetic winding comprising a first coil disposed in a first pair of slots in said first slot set of said plurality of stator slots and a second coil disposed in a second pair of slots in said first slot set of said plurality of stator slots;
said first coil of said first electromagnetic winding comprising a first number of turns in said first pair of slots in said first slot set of said plurality of stator slots;
said second coil of said first electromagnetic winding comprising a second number of turns in said second pair of slots in said first slot set of said plurality of stator slots that is greater than said first number of turns in said first pair of slots in said first slot set of said plurality of stator slots;
said second electromagnetic winding comprising a third coil disposed in a third pair of slots in said second slot set of said plurality of stator slots and a fourth coil disposed in a fourth pair of slots in said second slot set of said plurality of stator slots;
said third coil of said second electromagnetic winding comprising a third number of turns in said third pair of slots in said second slot set of said plurality of stator slots; and
said fourth coil of said second electromagnetic winding comprising a fourth number of turns in said fourth pair of slots in said second slot set of said plurality of stator slots that is greater than said third number of turns in said third pair of slots in said second slot set of said plurality of stator slots.

2. The electric motor assembly set forth in claim 1, wherein said first coil of said first electromagnetic winding with said first number of turns in said first pair of slots in said first slot set is disposed circumferentially between said second coil of said first electromagnetic winding with said second number of turns in said second pair of slots in said first slot set and said third coil of said second electromagnetic winding with said third number of turns in said third pair of slots in said second slot set.

3. The electric motor assembly set forth in claim 2, wherein said third coil of said second electromagnetic winding with said third number of turns in said third pair of slots in said second slot set is disposed circumferentially between said first coil of said first electromagnetic winding with said first number of turns in said first pair of slots in said first slot set and said fourth coil of said second electromagnetic winding with said fourth number of turns in said fourth pair of slots in said second slot set.

4. The electric motor assembly set forth in claim 1, wherein said first number of turns in said first pair of slots in said first slot set is equal to said third number of turns in said third pair of slots in said second slot set, and said second number of turns in said second pair of slots in said first slot set is equal to said fourth number of turns in said fourth pair of slots in said second slot set.

5. The electric motor assembly set forth in claim 1, wherein said first pair of slots in said first slot set comprises a first slot and a second slot, and said second pair of slots in said first slot set comprises said second slot in said first slot set and a third slot in said first slot set.

6. The electric motor assembly set forth in claim 1, wherein said first electromagnetic winding comprise a first phase, a second phase and a third phase, and said second electromagnetic winding comprise a fourth phase, a fifth phase and a sixth phase.

7. The electric motor assembly set forth in claim 6, wherein said first phase of said first electromagnetic winding comprises said first coil in said first pair of slots in said first slot set and said second coil in said second pair of slots in said first slot set.

8. The electric motor assembly set forth in claim 7, wherein said fourth phase of said second electromagnetic winding comprises said third coil in said third pair of slots in said second slot set and said fourth coil in said fourth pair of slots in said second slot set.

9. The electric motor assembly set forth in claim 8, wherein said second phase of said first electromagnetic winding comprise a fifth coil in a fifth pair of slots in said first slot set and a sixth coil in a sixth pair of slots in said first slot set.

10. The electric motor assembly set forth in claim 9, wherein said fifth coil of said first electromagnetic winding comprises a fifth number of turns in said fifth pair of slots in said first slot set and said sixth coil of said first electromagnetic winding comprises a sixth number of turns in said sixth pair of slots in said first slot set that is greater than said fifth number of turns in said fifth pair of slots in said first slot set.

11. The electric motor assembly set forth in claim 10, wherein said fifth phase of said second electromagnetic winding comprises a seventh coil in a seventh pair of slots in said second slot set and an eighth coil in an eighth pair of slots in said second slot set.

12. The electric motor assembly set forth in claim 11, wherein said seventh coil of said second electromagnetic winding comprises a seventh number of turns in said seventh pair of slots in said second slot set and said eighth coil of said second electromagnetic winding comprises an eighth number of turns in said eighth pair of slots in said second slot set that is greater than said seventh number of turns in said seventh pair of slots in said second slot set.

13. The electric motor assembly set forth in claim 12, wherein said third phase of said first electromagnetic winding comprise a ninth coil in a ninth pair of slots in said first slot set and a tenth coil in a tenth pair of slots in said first slot set.

14. The electric motor assembly set forth in claim 13, wherein said ninth coil of said first electromagnetic winding comprises a ninth number of turns in said ninth pair of slots in said first slot set and said tenth coil of said first electromagnetic winding comprises a tenth number of turns in said tenth pair of slots in said first slot set that is greater than said ninth number of turns in said ninth pair of slots in said first slot set.

15. The electric motor assembly set forth in claim 14, wherein said sixth phase of said second electromagnetic winding comprises an eleventh coil in an eleventh pair of slots in said second slot set and a twelfth coil in a twelfth pair of slots in said second slot set.

16. The electric motor assembly set forth in claim 15, wherein said eleventh coil of said second electromagnetic winding comprises an eleventh number of turns in said eleventh pair of slots in said second slot set and said twelfth coil of said second electromagnetic winding comprises a twelfth number of turns in said twelfth pair of slots in said second slot set that is greater than said eleventh number of turns in said eleventh pair of slots in said second slot set.

17. The electric motor assembly set forth in claim 1, wherein said stator comprises a winding-empty slot disposed circumferentially between said first electromagnetic winding in said first slot set of said plurality of stator slots and said second electromagnetic winding in said second slot set of said plurality of stator slots.

18. The electric motor assembly set forth in claim 1, wherein said stator slots of said first slot set are disposed circumferentially adjacent each other, and said stator slots of said second slot set are disposed circumferentially adjacent each other.

19. The electric motor assembly set forth in claim 18, wherein a first end stator slot of said first slot set is disposed circumferentially adjacent a second end stator slot of said second slot set.

20. The electric motor assembly set forth in claim 1, wherein said first electromagnetic winding comprise three or more electrical phases and a current that is passed through said first electromagnetic winding in a given stator slot of said first slot set is not of the same electrical phase as the current that is passed through said first electromagnetic winding in a stator slot of said first slot set that is adjacent said given stator slot.

21. The electric motor assembly set forth in claim 1, wherein said stator slots in said first slot set are disposed circumferentially in a first semicircle or first minor arc about said longitudinal axis and said stator slots in said second slot set are disposed circumferentially in a second semicircle or second minor arc about said longitudinal axis separate from said first semicircle or first minor arc about said longitudinal axis.

22. The electric motor assembly set forth in claim 21, wherein said stator slots in said first slot set are disposed circumferentially on a first side of a diameter center plane through said longitudinal axis and said stator slots in said second slot set are disposed circumferentially on a second side of said diameter center plane through said longitudinal axis.

23. The electric motor assembly set forth in claim 1, comprising a first power source connected to said first motor drive and configured to power said first electromagnetic winding and a second power source connected to said second motor drive and configured to power said second electromagnetic winding.

24. The electric motor assembly set forth in claim 23, wherein said first power source comprises a three phase AC power supply and said second power source comprises a capacitor or a battery and wherein said second motor drive is configured to operate a common DC bus such that energy from said first power source is used to charge said second power source when said second power source is not fully charged.

* * * * *